United States Patent [19]
Kuroe et al.

[11] Patent Number: 5,835,312
[45] Date of Patent: Nov. 10, 1998

[54] MAGNETIC HEAD FOR USE WITH A RECORDING MEDIUM

[75] Inventors: Akio Kuroe, Katano; Akio Murata, Takatsuki; Kazuo Yokoyama, Hirakata; Osamu Kusumoto, Nara, all of Japan

[73] Assignee: Matsushita Electric Industrial Co., Ltd., Osaka, Japan

[21] Appl. No.: 743,360

[22] Filed: Nov. 4, 1996

[30] Foreign Application Priority Data

Nov. 6, 1995 [JP] Japan ................................. 7-287274

[51] Int. Cl.$^6$ .................................................. G11B 5/127
[52] U.S. Cl. ............................................................ 360/110
[58] Field of Search .................................. 360/110, 111, 360/122, 125–126

[56] References Cited

U.S. PATENT DOCUMENTS

| | | | |
|---|---|---|---|
| 4,464,691 | 8/1984 | Sawazaki et al. | 360/111 |
| 5,331,491 | 7/1994 | Hayakawa et al. | 360/110 |

*Primary Examiner*—John H. Wolff
*Attorney, Agent, or Firm*—Wenderoth, Lind & Ponack, L.L.P.

[57] ABSTRACT

The present invention relates to a magnetic head for recording and reproducing signals from a magnetic recording medium, wherein the magnetic head comprises a stylus having a pair of electrodes, a conductive multilayer film having a staircase-shaped section, and a magnetic body formed on the multilayer film. The magnetic head further comprises an excitation conductive thin film disposed so as to surround the stylus, a magnetic yoke forming a closed magnetic loop together with a magnetic recording medium and the stylus, and an anti-abrasive film formed on the magnetic yoke so as to oppose the recording medium. During recording, a signal current is supplied to the excitation conductive thin film to generate a recording magnetic field from the end of the stylus. During reproduction, a high-frequency voltage is applied across the electrodes, and a magnetic impedance change of the stylus, caused by a signal magnetism on the recording medium, is detected. The relative position of the magnetic head to the recording medium is controlled by deflecting a cantilever according to a capacitance between the magnetic head and the recording medium. Accordingly, the magnetic head of the present invention is capable of remarkably enhancing recording densities and data transfer rates.

9 Claims, 7 Drawing Sheets

MAGNETIC HEAD FOR USE WITH A RECORDING MEDIUM

BACKGROUND OF THE INVENTION

1. Field of the Invention

The present invention relates to a magnetic head which remarkably enhances recording densities and which has excellent sensitivity.

2. Description of the Prior Art

Conventionally, most magnetic recording methods employed in magnetic recording and reproducing apparatus were to record and reproduce signals by using a magnetic ring head and a longitudinal recording magnetic medium. Generally, in a video tape recorder (VTR), a magnetic head mounted on a rotary cylinder rotating at, for example, 1800 rms, scans on a video tape obliquely relative to the longitudinal direction of the tape so as to record and reproduce signals. In this field, the recording density is notably increasing, and the minimum wavelength in recording is gradually becoming smaller, that is, 1.32 $\mu$m in the VHS-VTR, 0.7 $\mu$m in the 8 mm VTR, and 0.488 $\mu$m in the DVC (Digital video cassette)-VTR. When expressed in the recording area, the recording area in the DVC-VTR is as small as 2.5 $\mu m^2$ per recording information bit.

It has also been proposed to record and reproduce signals magnetically by using a conductive stylus as disclosed in Japanese Laid-open Patent Publication No. 3-51201 and Japanese Laid-open Patent Publication No. 3-52103. According to the proposals, when the conductive stylus is opposed to the surface of a conductive magnetic recording medium as close as 10 Å, a tunnel current begins to flow. When a magnetized portion exists on magnetic recording medium, the stylus crosses the magnetic flux generated from the magnetized portion, so that the magnetic substance composing the stylus is magnetized, and hence it is displaced by receiving a force from the magnetization on the magnetic recording medium. Accordingly, when the tunnel current is properly controlled so that the space between the magnetic recording medium and the stylus is constant, the control voltage changes. By detecting the control voltage, the intensity of magnetization on the magnetic recording medium can be detected. With this method, the recording density can be enhanced remarkably.

A conventional stylus manufacturing method is disclosed in the Journal of Vacuum Science & Technology B (JVST B), Vol. 12, No. 3, May/June 1994, pp. 1591–1595, "Application of MHz-frequency detection to noncontact scanning force microscopy", H. J. Hug et al., in which the leading end of the stylus is sharpened by electrolytically etching a tungsten wire or the like, and a ferromagnetic alloy of cobalt (Co), iron (Fe), nickel (Ni), or the like is formed on the stylus by electroplating or sputtering. As used in the commercial magnetic force microscope, another attempt is made to form a pyramid-shape leading end on a cantilever by employing a photolithographic technique, and by forming a magnetic substance on the leading end.

Another proposed method is to achieve a high density recording of a 500 Å or less diameter per information bit, as disclosed in Japanese Laid-open Patent Publication No. 3-52102 and Japanese Laid-open Patent Publication No. 3-52103. In this method, the magnetic stylus is excited by a signal to generate a magnetic field at the leading end of the magnetic stylus thereby to magnetize the magnetic recording medium in the recording mode. In the reproduction mode, the force received from the signal magnetic field recorded on the magnetic recording medium causes vibration of the cantilever having the magnetic stylus provided on a part of the leading end thereof. The resonant amplitude, due to shifting of the resonance curve of the cantilever, is detected by a laser beam.

Generally, as discussed in the above-mentioned methods, enhancement of the recording density in the conventional techniques has been achieved by extremely long period efforts of improving the magnetic tape and head. That is, to seek high density recording by reducing the recording area of the magnetic recording medium, which is defined by a product of half the recording wavelength (½λ) and the track width, improvements in the S/N (signal to noise ratio) of the head-tape system were necessary. Accordingly, it is extremely difficult to seek significant increases of the recording density. In spite of this fact, further enhancements of the recording density is currently desired.

Accordingly, it is necessary to achieve further remarkable increases of the recording density to present a novel recording and reproducing method which is based on a completely different concept from the conventional methods. In the above method using the cantilever, remarkable increases in the recording density were expected, but there is a limit in the mechanical resonance of the cantilever, and the high data transfer rate determined by the resonance frequency of the cantilever is about 30 kbps at the highest. This is far lower than 80 Mbps, the value comparable to the hard disk.

On the other hand, in the magnetic sensor as reported in the Journal of the Magnetics Society of Japan, Vol. 18, Nov. 2, 1994, pp. 493–498, "Magnetic-Impedance Element Using Amorphous Micro Wire", Kenichi Bushida et al., an amorphous wire of a slightly negative magnetorestriction possesses an easy axis of magnetization in the circumferential direction, and a high-frequency voltage applied across both ends of the amorphous wire is expressed as the sum of the resistance of the amorphous wire and the value d$\phi$/dt caused due to a flow of a magnetic flux d$\phi$ in the circumferential direction generated by a high-frequency current flowing through the amorphous wire. When a magnetic field is applied in the longitudinal direction of the amorphous wire, the magnetization in the circumferential direction is influenced to change the impedance across both ends of the amorphous wire, so that the voltage changes depending on the intensity of the applied magnetic field. According to this technique, it is expected to respond to the signal magnetic field of 10 MHz or more. This element will hereinafter be referred to as "magneto-impedance element" or "MI element".

Although the reproduction method using the cantilever provided with the electric conductive stylus or magnetic stylus and the MI element are studied, any magnetic recording and reproducing apparatus which has mounted thereon the stylus and is properly useful has not been developed. Also, any method of using and manufacturing the MI element as the stylus for magnetic recording and reproduction has not been developed. Accordingly, in the method using the cantilever as described above, it is expected that the recording density may be enhanced greatly, but, due to the limit of the mechanical resonance of the cantilever, the data transfer rate is limited to about 30 kbps, which is far smaller than the 80 Mbps data transfer rate of the hard disk. To further enhance the data transfer rate, it is needed to add new ideas.

SUMMARY OF THE INVENTION

It is hence an object of the invention, which is devised in light of the above-mentioned problems, to present a novel magnetic head capable of remarkably enhancing the recording density and data transfer rate.

To achieve the above object, a magnetic head of the present invention comprises a stylus having a pair of electrodes, an electrically conductive multilayer film having a staircase section, and a magnetic substance formed on the conductive multilayer film. The magnetic head further comprises an electrically conductive thin film for excitation surrounding the stylus, a magnetic yoke forming a closed magnetic loop together with a magnetic recording medium and the stylus, and an anti-abrasive film formed on the magnetic yoke so as to oppose to the magnetic recording medium.

DESCRIPTION OF THE PREFERRED EMBODIMENTS

Referring now to the accompanying drawings, embodiments of the present invention will be described specifically below.

Figure 1:
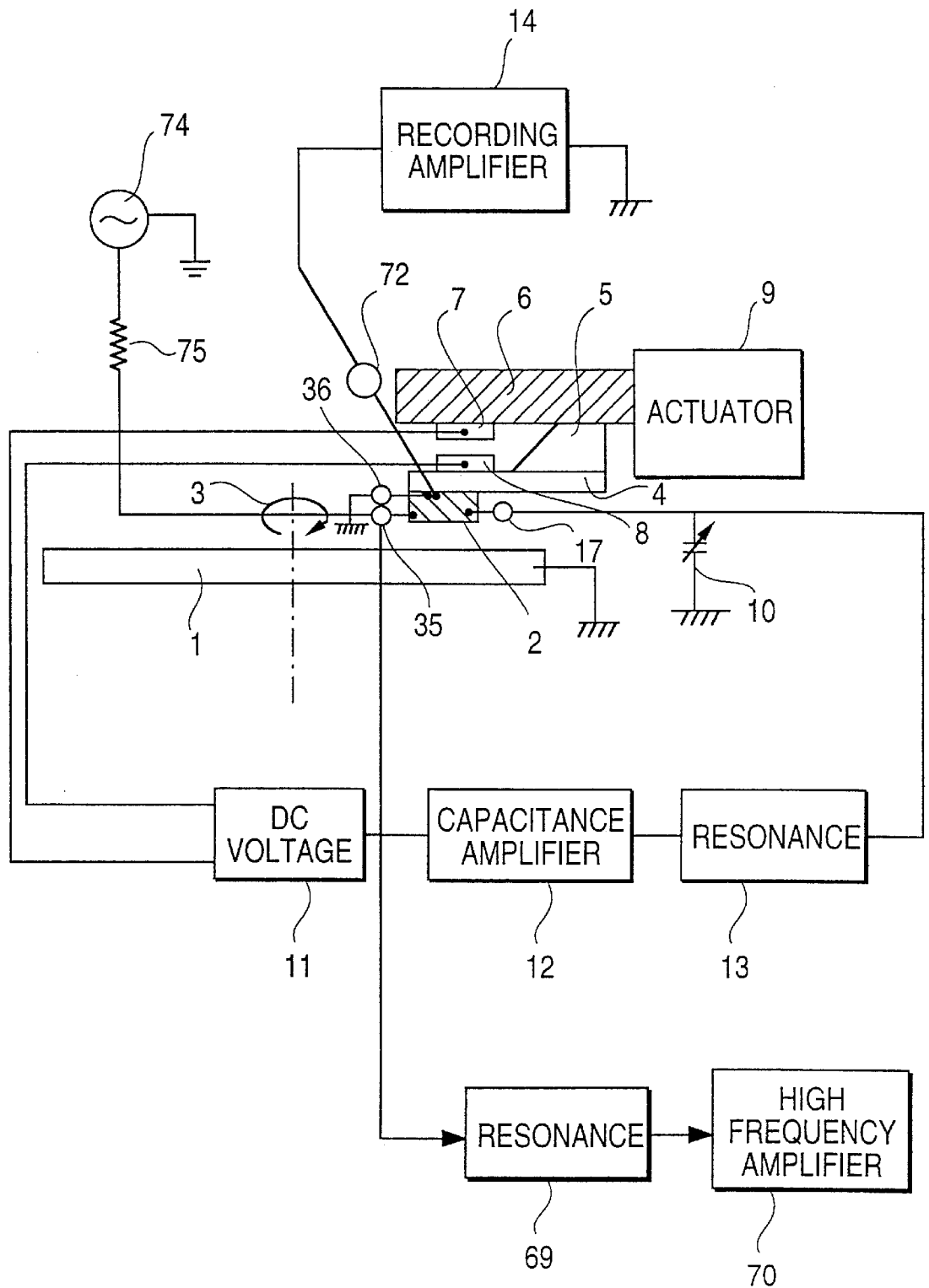
FIG. 1 is a block diagram showing an embodiment of a magnetic recording and reproducing apparatus according to the present invention.
Figure 2:
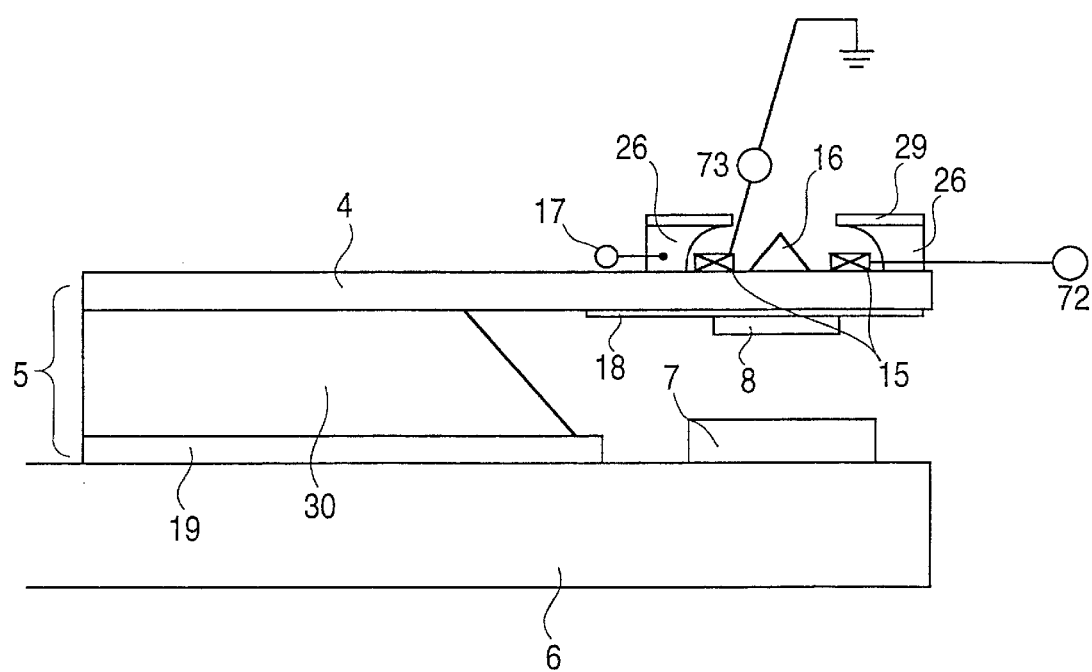
FIG. 2 is a structural diagram showing an embodiment of a magnetic head unit of the present invention.

First, referring to FIGS. 1 and 2, a magnetic recording and reproducing apparatus in an embodiment of the present invention will be described. FIG. 1 is a block diagram showing a magnetic recording and reproducing apparatus in an embodiment of the invention. FIG. 2 is a structural diagram showing a magnetic head unit forming a magnetic head on a cantilever. The principle of the operation of the magnetic recording and reproducing apparatus is described. In FIG. 1, a magnetic head 2 is disposed opposite from a bilayer perpendicular magnetic medium (magnetic disk) 1. A signal voltage from a recording amplifier 14 is applied to terminals 72 and 73 of an electrically conductive thin film 15 for excitation, as shown in FIG. 2, to magnetically excite a stylus 16. A signal magnetic field generated from the leading end of the excited stylus magnetizes a tiny area of the bilayer perpendicular magnetic medium 1 rotating in the direction of arrow 3 in FIG. 1. In a reproduction mode, the magnetic flux generated from the signal magnetization is reproduced by a magnetic impedance element (MI element) constituting the stylus 16 (the detailed structure will be described later with reference to FIG. 4 and the subsequent figures). A high-frequency bias signal is applied from a high-frequency oscillator 74 through a resistor 75 to electrodes 36 and 35 which are disposed at 180° opposite positions from each other with respect to the center of the conductive thin film of the MI element (hereinafter referred to as "opposite positions"), and a high-frequency resonance circuit 69 is connected to the electrodes 35 and 36 to resonate with the impedance of the stylus. In this constitution, the resonance curve is shifted by a change of the magnetic impedance of the stylus due to the signal magnetic field generated from the magnetic recording medium, so that the amplitude or frequency of the high-frequency signal changes. Here, the amplitude change of the high-frequency signal is amplified by a high-frequency signal amplifier 70, and is detected.

Moreover, at the time of recording or reproducing, the spacing between the bilayer perpendicular magnetic medium and the magnetic head can be controlled so as to be constant by detecting the capacitance generated between them and controlling the capacitance to always be constant. At this time, the bilayer perpendicular magnetic medium 1 is electrically grounded so as to stably detect the capacitance. Each of a perpendicular layer 21 (FIG. 4) forming the bilayer perpendicular magnetic medium 1, a soft magnetic layer 22 (FIG. 4) made of permalloy or an amorphous material, and a magnetic yoke 26 of the magnetic head is made of an electrically conductive metal layer made of a soft magnetic material such as permalloy. Therefore, an electrode 17 for detecting the capacitance is provided on the magnetic yoke 26, and a resonance system is formed by an electric resonance circuit 13 together with a capacitance 10 at the spacing between the magnetic recording medium and the magnetic head. The resonance frequency varies in response to variation of the capacitance 10 caused by a change of the spacing (or distance) between the bilayer perpendicular magnetic medium and the magnetic head. A capacitance amplifier 12 detects and amplifies this changed amplitude or frequency. A direct-current voltage unit 11 is responsive to the output of the capacitance amplifier 12 to generate a direct-current (DC) voltage dependent on the spacing change, and the unit them applies the generated DC voltage to an electrode 8, which is a first electrode formed on the opposite surface (the inner bottom surface) of the cantilever 4 to the surface on which the magnetic head 2 is formed, and an electrode 7 which is a second electrode formed on an arm 6 which is a second substrate, to thereby deflect the cantilever 4 on a cantilever support table 5 so as to control the spacing between the magnetic head and the bilayer perpendicular magnetic medium.

The arm 6 is fixed on an actuator 9 for coarse adjustment, and is constructed so as to roughly adjust the spacing. Compared with the magnetic head of the ordinary hard disk drive (HDD), which floats while keeping a specific distance from the recording disk by making use of the air pressure generated between the magnetic disk rotating at high speed and the header slider on which the head is mounted, the above-described capacitance type spacing control method is particularly effective when the disk diameter is small and the rotating speed of the magnetic recording medium is slow, in which case the air pressure cannot be utilized and the magnetic head does not float. The magnetic head unit of the present invention will be further described below. The magnetic head 2 and the magnetic head unit are constituted as shown in FIG. 2. The portion of the stylus 16 in FIG. 2 will be more specifically described later with reference to FIG. 4.

Figure 3:
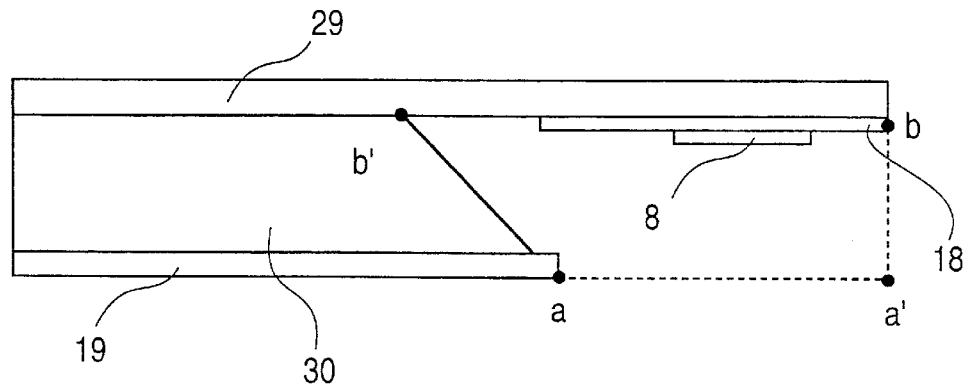
FIG. 3(A) is a structural diagram showing an embodiment of a manufacturing process of the magnetic head unit of the invention, in a magnified view of a cantilever manufactured from a silicon substrate.
FIG. 3(B) is a structural diagram showing the manufacturing process of the magnetic head unit of the invention, in a magnified view of forming the magnetic head on the cantilever.
FIG. 3(C) is a structural diagram showing the manufacturing process of the magnetic head unit of the invention, in a diagram showing the state of forming the arm and electrodes.
Figure 3:
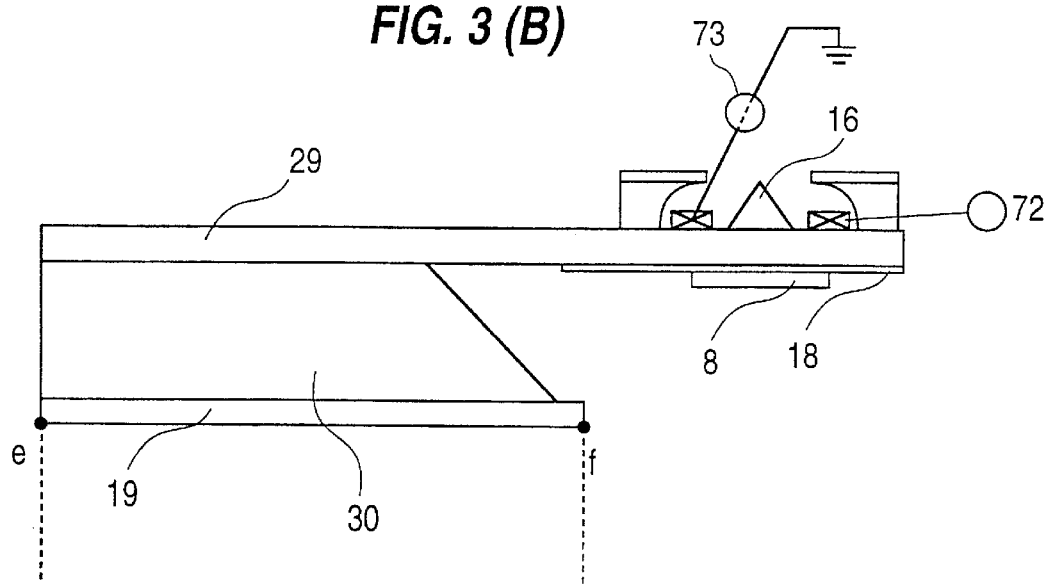
Figure 3:
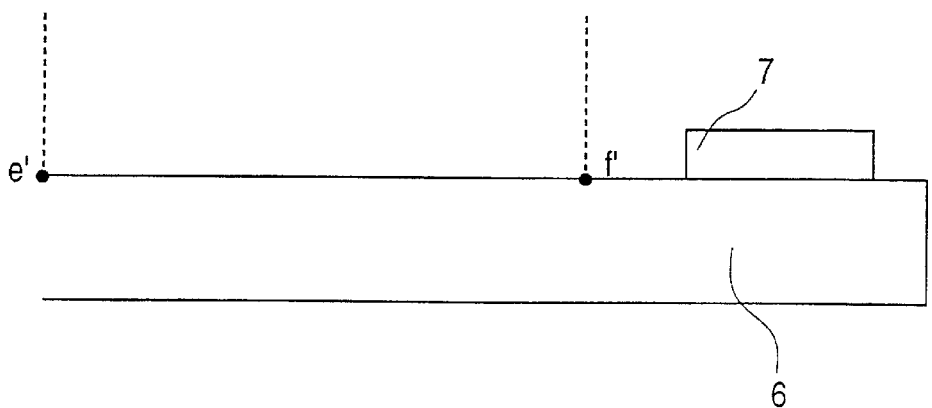

A method of manufacturing the magnetic head unit shown in FIGS. 1 and 2 will be described with reference to FIGS. 3(A) to 3(C). First, as shown in FIG. 3 (C), a block is constructed by forming an electrode 7 which is a second electrode on an arm 6 which is a second substrate to be fixed to the an actuator 9 in FIG. 1. The electrode 7 may be made of an electrically conductive metal thin film made of copper, aluminum, gold or any other conductive metal or metal alloy. The arm 6 may be made of an insulating material such as ceramic. Next, as shown in FIG. 3(A), silicon nitride layers 19 and 29 having a thickness of 0.5 to 1.0 µm is formed on each of the opposite surfaces of a silicon substrate 30 having a thickness of 0.6 mm, and one silicon nitride layer 19 is dry etched by using a mask to remove the portion indicated by a–a'. Then, the silicon substrate 30 is etched by using potassium hydroxide aqueous solution, so that the quadrilateral portion indicated by a–a'–b–b' is removed by anisotropic etching of the silicon substrate 30. Thereafter, an $SiO_2$ layer 18 is formed on the silicon substrate etched-side surface (inner bottom surface) of the other silicon nitride layer 29 (cantilever), and an electrode 8, which is a first electrode, is formed on the $SiO_2$ layer 18. Instead of the $SiO_2$, layer, an insulating layer of alumina or any other ceramic may be used. Then, as shown in FIG. 3 (B), the magnetic head including the stylus 16 is formed by photolithography on the opposite surface (outer bottom surface) to the inner bottom surface of the silicon nitride layer 29 (cantilever). The e–f surface of the first block shown in FIG. 3(B), in which the magnetic head is formed, and the e'–f' surface of the second block shown in FIG. 3(C) are adhered to each other with an inorganic adhesive, to thereby obtain the magnetic head unit shown in FIG. 2.

Figure 4:
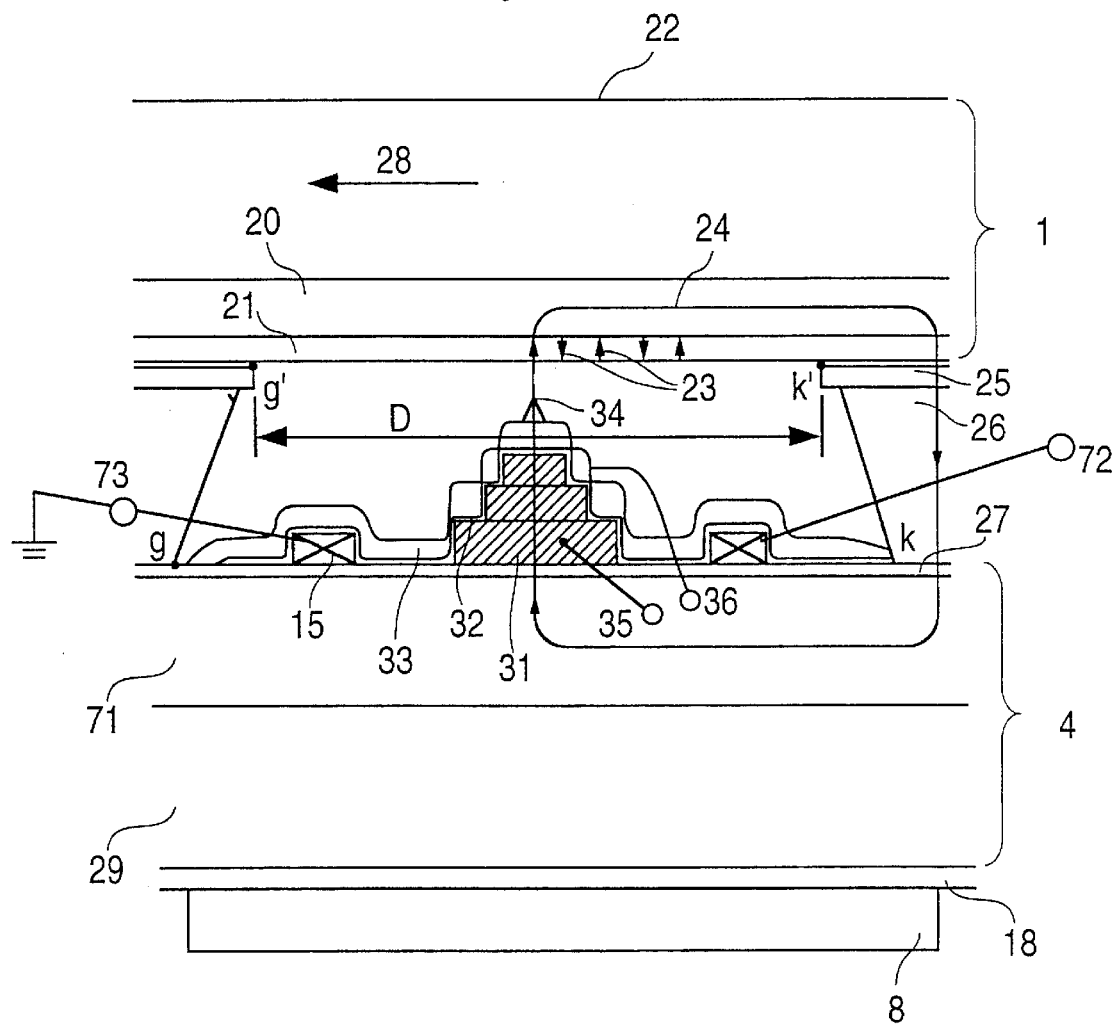
FIG. 4 is a magnified view of the embodiment of the magnetic head of the invention.

The structure of the stylus part and a method of manufacturing the stylus part will be described. FIG. 4 shows the structure of the magnetic head with a magnified view of the stylus part. First, the manufacturing method will be described. The cantilever 4 shown in FIG. 1 is produced by forming a permalloy layer 71 which is a first soft magnetic substance on the outer bottom surface of the silicon nitride layer 29, and an insulating layer 27 is formed thereon. The insulating layer may be made of $SiO_2$, ceramics, alumina or the like, and the soft magnetic substance may be made of permalloy, cobalt amorphous alloy, ferriferous alloy, sendust, or the like. The thickness of the insulating layer may preferably be 0.1 µm or less so as to decrease the magnetic resistance.

Thereafter, on the insulating layer 27, a permalloy layer 26 for the magnetic yoke is formed as a second soft magnetic substance, and an anti-abrasive DLC (diamond-like carbon) layer 25 is formed thereon. Then, using a mask, a hole having a sufficient diameter D to form the stylus therein is formed in the DLC layer 25 by dry etching, and the permalloy layer 26, which is the second soft magnetic substance, is etched by chemical etching. Next, an electrically conductive thin film 15 for excitation and a multilayer conductor layer 31, structured in stairs to decrease its sectional area as moving away from the outer bottom surface, are formed and coated with an insulating layer 32, and then a permalloy layer 33 is formed thereon as a third soft magnetic substance. Thereafter, on the uppermost soft magnetic substance, a permalloy body 34 which is a fourth soft magnetic substance in a needle or blade shape having an extremely tiny leading end is formed by using a mask having a tiny hole in a specific shape. In this step, over the course of time of sputter depositing the permalloy from the surface of the mask, the hole of the specified shape becomes smaller on the surface of the mask and is finally clogged. As a result, the permalloy 34 which is the fourth soft magnetic substance formed on the permalloy layer 33, which is the third soft magnetic substance, is formed in a needle form or a blade form by using the mask having a circular hole or a rectangular hole.

The thus manufactured magnetic head is disposed so as to confront the bilayer perpendicular magnetic recording medium 1 moving in the direction of the arrow 28, as shown in FIG. 4. When a signal recording current flows in the excitation conductive thin film 15, the permalloy layer 33 which is the third soft magnetic substance and the permalloy body 34 which is the fourth soft magnetic substance on the multilayer conductor layer 31 are magnetized, so that a strong magnetic field is generated at the leading end of the needle or blade formed magnetic body 34, and the perpendicular layer 21 of the bilayer perpendicular magnetic recording medium 1 is magnetized. As a result, a signal magnetization 23 remains in the bilayer perpendicular magnetic recording medium. The magnetic flux 24, generated by the excitation, flows efficiently in the closed magnetic loop constituted by the soft magnetic layer 20 of the bilayer perpendicular magnetic recording medium, the magnetic yoke 26 made of the soft magnetic substance having high permeability on the cantilever, the permalloy layer 71 (the first soft magnetic layer), and the permalloy layers 33 and 34 (the third and fourth soft magnetic substances) which form the stylus. Incidentally, since the area of the magnetic yoke 26 with respect to the magnetic recording medium is made sufficiently wider than the area of the stylus leading end, the magnetic recording medium will not be magnetized. Meanwhile, since the DLC layer 25 formed on the magnetic yoke 26 is an extremely hard material, it is effective to protect the leading end of the permalloy body 34, which is the needle-shape fourth soft magnetic substance of the stylus, when the stylus comes in contact with the magnetic recording medium. Accordingly, it is important to make the distance of the leading end of the needle-shape magnetic body from the surface of the magnetic recording medium to be larger than the distance between the DLC layer and the magnetic recording medium. Moreover, in order to protect the leading end of the stylus from abrasion, it is effective to fill the space indicated by g–g'–k–k' (in which the stylus is formed) with a glass or the like to prevent entry of dust or grinding powder of the materials forming the magnetic recording medium and the magnetic head.

The bilayer perpendicular magnetic recording medium 1 will now be described in greater detail. The bilayer perpendicular magnetic recording medium 1 comprises a nonmagnetic substrate 22 produced by polishing a silicon substrate to have a surface roughness of 30 Å, a soft magnetic layer 20 made of a cobalt amorphous alloy layer formed on the nonmagnetic substrate 22, and a perpendicular layer 21 made of a cobalt-chromium-tantalum (Co—Cr—Ta) alloy layer formed on the soft magnetic layer 20 by sputtering or evaporation. The non-magnetic substrate 26 may be made of, aside from silicon having excellent surface smoothness, glass, ceramics, metal like aluminum, carbon, and the like. The soft magnetic layer may be made of permalloy and the like, aside from the cobalt amorphous alloy layer.

At the time of reproduction, as the permalloy body 34, which is the fourth soft magnetic substance, crosses the magnetic field generated from the magnetized portion of the recorded perpendicular layer 21, the magnetic flux 24 generated from the magnetized surface of the magnetic recording medium flows, in the same way as in the case of recording, efficiently in the closed magnetic loop constituted by the soft magnetic layer 20 of the bilayer perpendicular magnetic recording medium, the magnetic yoke 26 made of the soft magnetic substance having high permeability on the cantilever, the permalloy layer 71 (the first soft magnetic layer), and the permalloy layers 33 and 34 (the third and fourth soft magnetic substance) which form the stylus.

The present invention makes use of the change of the high-frequency impedance of the soft magnetic stylus by the external magnetic field. That is, the high-frequency impedance of the stylus is expressed by the sum of the impedance at a high frequency fc and conductor resistance between the electrodes 35 and 36 which are provided at opposite positions on the conductive multilayer thin film. When an external magnetic field (here, the signal magnetic field from the bilayer perpendicular magnetic medium 1) is applied in this state, the direction of magnetization of the stylus is changed by the external magnetic field, and hence the impedance at the frequency fc varies. This change is detected between the electrodes 35 and 36 in such a form that the high-frequency fc signal is amplitude modulated by the external magnetic field. In this way, the stylus functions as an MI element. Accordingly, in order to change the high-frequency magnetic impedance largely by the external magnetic field applied to the stylus, it is required that the magnetic substances constituting the stylus change largely by the external magnetization. In this embodiment, the frequency fc may be 500 MHz.

Figure 5A:
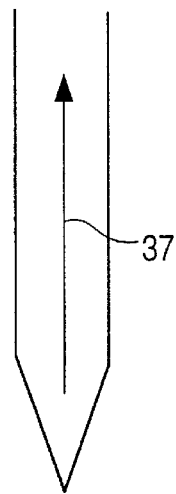
FIG. 5(A) is a diagram showing the state of easy axis of magnetization of the conventional stylus.
Figure 5B:
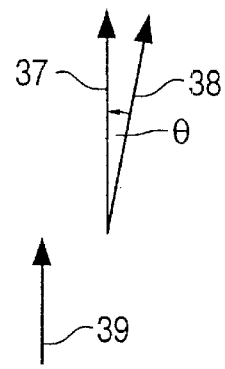
FIG. 5(B) is an operation principal diagram showing changes of magnetization of the conventional stylus.

Next, the structure and operating principle of the stylus, which operates efficiently and effectively as an MI element, will be described with reference to FIGS. 5(A) to 5(E). Usually, the stylus may be formed in a needle, conical or pyramidal shape. An example is a conical- or pyramidal-shape stylus with the height of about 10 $\mu$m, the bottom diameter of 5 to 10 $\mu$m, and the diameter at the leading end finished to be about 60 nm. Another example is an acicular-shape stylus produced by chemical etching a permalloy wire with the diameter of 100 $\mu$m to have a diameter of 10 $\mu$m at a position of 20 $\mu$m from the leading end. As shown in FIG. 5(A), in this type of soft magnetic substance stylus, the easy axis of magnetization is determined by the shape of the stylus, and is formed in the length direction of the arrow 37. This effect becomes remarkable when moving towards the leading end, or as the diameter decreases. Accordingly, as shown in FIG. 5(B) since the direction of the external magnetic field indicated by the arrow 39 coincides with the direction of the easy axis of magnetization indicated by the arrow 37, the rotation angle $\theta$ of the direction of magnetization of the stylus shown by the arrow 38 with respect to the direction of the easy axis of magnetization is small, so that a change in the amount of the impedance is small. This corresponds to a low permeability of the stylus.

Figure 5C:
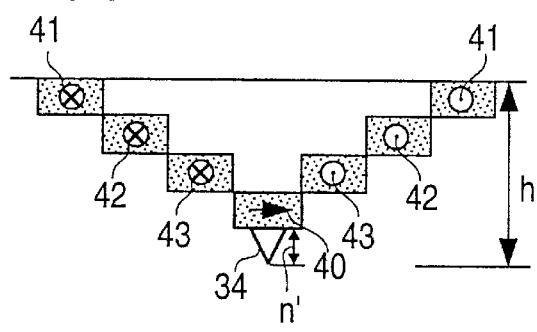
FIG. 5(C) is a sectional view showing the state of easy axis of magnetization of a stylus of the present invention.
Figure 5E:
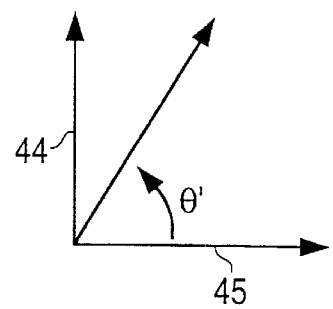
FIG. 5(E) is an operation principle diagram showing changes of magnetization of the stylus of the invention.
Figure 5D:
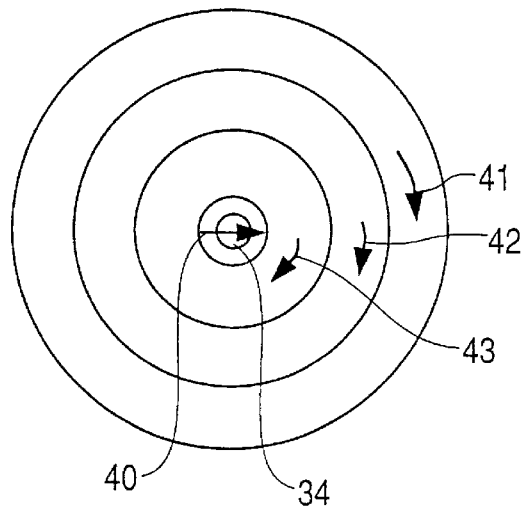
FIG. 5(D) is a plan view showing the state of easy axis of magnetization of the stylus of the invention.

On the other hand, according to the stylus of the invention, which will be explained by using an example of a circular stylus shown in FIGS. 5(C) and 5(D), magnetic substance films are formed on conductive thin films laminated in the form of stairs. In this structure, the easy axis of magnetization of the magnetic substance film of each stage, except for the uppermost stage, is in a direction perpendicular to the drawing sheet in FIG. 5(C), and the easy axis of magnetization at the uppermost stage indicated by the arrow 40 is in the in-plane direction of the magnetic substance. In the plan view of FIG. 5(D), the easy axes of magnetization are in the directions as indicated by arrows 41, 42, 43 and 40, respectively. Accordingly, in the magnetic substance films, except for the needle- or blade-shape magnetic body 34, the external magnetic field 44 is applied nearly in the perpendicular direction to the easy axis of magnetization, or in the same direction as the hard axis direction 45 shown in FIG. 5(E). In this case, therefore, the magnetization rotates at a large angle $\theta'$ with respect to the direction of the external magnetic field as shown in FIG. 5(E). That is, the permeability is large, and the impedance changes largely in response to the change of the external magnetic field. The needle- or blade-shape magnetic body 34 is preferably made as small as possible, with its height h' being $\frac{1}{5}$ or less the height h of the entire stylus.

Figure 6:
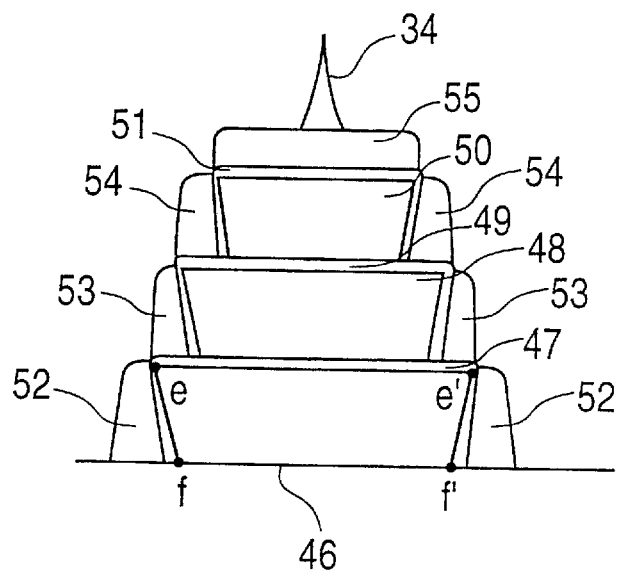
FIG. 6 is a magnified view showing a shape of a conductive thin film for forming the stylus of the invention.

Next, with reference to FIG. 6, description will be made as to a method for decreasing the magnetic interaction between the magnetic substances at the stages formed in the staircase shaped electrically conductive multilayer thin film of the invention to enforce the anisotropy in the direction of easy axis of magnetization. In the process of forming the conductive thin films 46, 48 and 50 by sputter deposition, thin films 47, 49 and 51 of $SiO_2$ or the like are evaporated between the respective layers, and are then etched chemically so that the lower end f–f' of each conductive thin film becomes smaller than the upper end e–e' of the same. When a soft magnetic substance is formed on the thus produced structure, the soft magnetic layers 52, 53, 54 and 55 are physically separated from each other at the edge of each stage. This structure is effective so as to reduce the magnetic interaction, thereby improving the efficiency of the impedance detection. A reason why the lower end f–f' can be formed smaller than the upper end e–e' of each conductive thin film may be that the $SiO_2$ film formed on the side surface of the conductive thin film is thinner and has more defects than that formed on the upper surface, and hence is etched sooner. The thin films 47, 49 and 50 made be preferably made, rather than $SiO_2$, of an electrically conductive material such as, for example, Cr, TiW and the like, because it is necessary to form electrodes thereon.

Figure 7A:
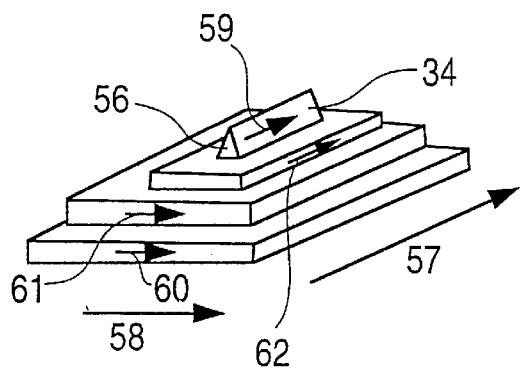
FIG. 7(A) is a structural diagram of a rectangular stylus in an embodiment of the present invention.
Figure 7B:
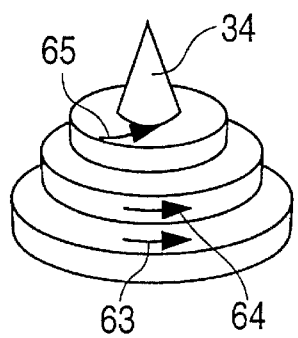
FIG. 7(B) is structural diagram of a circular stylus in another embodiment of the present invention.
Figure 7C:
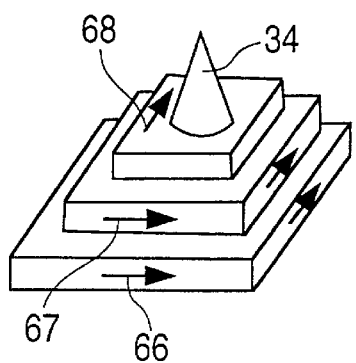
FIG. 7(C) is a structural diagram of a quadrilateral stylus in still another embodiment of the present invention.

FIGS. 7(A) to 7(C) show other structures of the stylus. FIG. 7(A) shows a structure manufactured by the manufacturing method described earlier, by using a rectangular mask for forming the conductive multilayer film, and a mask having formed therein a tiny rectangular hole for forming the blade-shape soft magnetic body 34. In this stylus, when, during recording, the bilayer perpendicular magnetic recording medium is moved in the direction of the arrow 57, that is, when the stylus is arranged such that the shape of the fourth magnetic substance as seen from the axial direction of the stylus leading end is in a rectangular shape having its longer side in the direction in which the magnetic head moves along the surface of the magnetic recording medium (e.g., in the radial direction in case of a magnetic recording disk), the signal magnetization is determined at the blade side surface 56 of the trailing side. Accordingly, a signal can be written at the edge of the blade side surface 56, and an overwriting is possible, which is an excellent feature. During reproduction, when the bilayer perpendicular magnetic recording medium is moved in the direction of the arrow 58, that is, when the stylus is arranged such that the shape of the fourth magnetic substance as seen from the axial direction of the stylus leading end is in a rectangular shape having its shorter side in the head moving direction along the surface of the magnetic recording medium, the recorded signal can be reproduced on a wide track in the direction of arrow 58 and the servo control like tracking can be easily performed. Therefore, a stable signal reproduction is made possible by rotating the magnetic head by 90° from the position at the time of recording. This blade-shape soft magnetic layer 34 has the easy axis of magnetization in the length direction of the blade by the effect of the shape, and hence functions more favorably at the time of reproduction. Arrows 60 and 61 indicate the directions of the easy axes of magnetization described before.

FIGS. 7(B) and 7(C) show styluses manufactured by using a circular mask and a rectangular mask, respectively, for forming the conductive multilayer film, and a mask having formed therein a tiny circular hole for forming the conical soft magnetic body 34. The operation of these styluses were described earlier. In the stylus shown in FIG. 7(B), the direction of the easy axis of magnetization is in the length direction of a band-shaped magnetic substance with a circular section as indicated by arrows 63 and 64. In the stylus shown in FIG. 7(C), the direction of the easy axis of magnetization is in the length direction of the magnetic substance having a square section as indicated by arrows 66 and 67. In the magnetic substance at the uppermost stage, in FIGS. 7(A), 7((B) and 7(C), the easy axis of magnetization is formed in the in-plane direction as indicated by arrows 62, 65 and 68, respectively. The diameter of the leading end of the needle- or blade-shape soft magnetic body 34 may be about 500 Å.

Signals were recorded and reproduced by using the magnetic recording and reproducing apparatus equipped with the thus produced magnetic head and magnetic head unit, and the results were compared with the result of using the conventional cantilever. In the case of recording by using the conventional cantilever, the diameter of the circular record pattern was about 500 Å, and the data transfer rate was 30 Mbps at a cantilever resonance frequency of 30 kHz. On the other hand, in case of using the magnetic head and the magnetic recording and reproducing apparatus of the present invention, the diameter of the circular record pattern was also about 500 Å, and a signal magnetic field up to 100 MHz was reproduced at a favorable S/N ratio by using a high-frequency current of 500 MHz. That is, the data transfer rate was 100 Mbps. Accordingly, it was confirmed that the data transfer rate could be notably enhanced.

The recording density of the conventional stylus in terms of the used area was 2.5 $\mu m^2$ per bit. On the other hand, the recording density obtained by using the stylus of the present invention was $10^{-3}$ $\mu m^2$, and the data transfer rate was higher than that of the hard disk level (80 Mbps). Hence, the recording density corresponding to three digits of the conventional recording density was obtained and the data transfer rate was also enhanced.

What is claimed is:

1. A magnetic head for use with a magnetic recording medium, said magnetic head comprising:
    a stylus comprising a pair of electrodes, a conductive multilayer film having a staircase-shaped section, and a magnetic body formed on said conductive multilayer film;
    a conductive thin film for excitation, wherein said conductive thin film is disposed so as to surround said stylus;
    a magnetic yoke forming a closed magnetic loop together with the magnetic recording medium and said stylus; and
    an anti-abrasive film formed on said magnetic yoke so as to oppose the magnetic recording medium.

2. A magnetic head for use with a magnetic recording medium, said magnetic head comprising:
    a stylus comprising a conductive multilayer film having a staircase-shaped section and having a pair of electrodes located at opposite positions from each other, and a magnetic body formed on said conductive multilayer film;
    a conductive thin film for excitation, wherein said conductive thin film is disposed so as to surround said stylus;
    a magnetic yoke forming a closed magnetic loop together with the magnetic recording medium and said stylus; and
    an anti-abrasive film formed on said magnetic yoke so as to oppose the magnetic recording medium,
    wherein said magnetic head operates in a recording mode such that a leading end of said stylus generates a magnetic field by applying a signal current to said conductive thin film to thereby magnetize the magnetic recording medium, and wherein said magnetic head operates in a reproducing mode such that a magnetic impedance of said stylus detectably changes in response to a change of a magnetic field generated from a signal magnetization on the magnetic recording medium by applying a high-frequency voltage across said pair of electrodes.

3. A magnetic head according to claim 2, wherein a distance between the leading end of said stylus and the magnetic recording medium is larger than a distance between said anti-abrasive film and the magnetic recording medium.

4. A magnetic head according to claim 2, wherein said conductive multilayer film comprises a plurality of conductive layer laminated on a surface of a cantilever to form the staircase-shaped section, wherein areas of said plurality of conductive layers decrease with an increase of a distance from a bottom surface of said conductive multilayer film, and wherein said stylus further comprises a magnetic layer formed on said conductive multilayer film, wherein the magnetic body is formed on said magnetic layer and has a sharp leading end.

5. A magnetic head according to claim 4, wherein an area of a lower surface is larger than an area of an upper surface of each of said plurality of conductive layers.

6. A magnetic head according to claim 2, wherein said conductive multilayer film, as viewed from the leading end of said stylus, has a rectangular shape having its longer sides in a direction in which said magnetic head moves along the magnetic recording medium, and wherein said magnetic body formed on said conductive multilayer film is in a blade-shape parallel to the longer sides of the rectangular shape of said conductive multilayer film.

7. A magnetic head according to claim 2, wherein said conductive multilayer film, as viewed from the leading end of said stylus, has a rectangular shape having its shorter sides in a direction in which said magnetic head moves along the magnetic recording medium, and wherein said magnetic body formed on said conductive multilayer film is in a blade-shape parallel to the shorter sides of the rectangular shape of said conductive multilayer film.

8. A magnetic head according to claim 2, wherein said conductive multilayer film, as viewed from the leading end of said stylus, has a rectanular shape having its longer sides in a direction in which said magnetic head moves along the magnetic recording medium, and wherein said magnetic body formed on said conductive multilayer film is in a conical or pyramidal shape.

9. A magnetic head according to claim 2, wherein said conductive multilayer film, as viewed from the leading end of said stylus, has a square or circular shape, and wherein said magnetic body formed on said conductive multilayer film is in a conical or pyramidal shape.

\* \* \* \* \*